United States Patent
Mao

(10) Patent No.: US 10,216,264 B2
(45) Date of Patent: Feb. 26, 2019

(54) SIGNAL ACQUIRING DEVICE, VIRTUAL REALITY APPARATUS AND CONTROL METHOD THEREOF

(71) Applicant: BOE TECHNOLOGY GROUP CO., LTD., Beijing (CN)

(72) Inventor: Defeng Mao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/529,173

(22) PCT Filed: Sep. 26, 2016

(86) PCT No.: PCT/CN2016/100047
§ 371 (c)(1),
(2) Date: May 24, 2017

(87) PCT Pub. No.: WO2017/128748
PCT Pub. Date: Aug. 3, 2017

(65) Prior Publication Data
US 2018/0074579 A1     Mar. 15, 2018

(30) Foreign Application Priority Data

Jan. 25, 2016    (CN) .......................... 2016 1 0049802

(51) Int. Cl.
*G06F 3/01*          (2006.01)
*G06F 1/16*          (2006.01)
(Continued)

(52) U.S. Cl.
CPC ................ *G06F 3/012* (2013.01); *G06F 1/16* (2013.01); *G06F 1/163* (2013.01); *G06F 3/01* (2013.01);
(Continued)

(58) Field of Classification Search
CPC ........ G06F 3/012; G06F 3/0346; G06F 3/013; G06F 1/163; G06F 1/16; G06F 3/01;
(Continued)

(56) References Cited

U.S. PATENT DOCUMENTS

| 4,254,451 A | * | 3/1981 | Cochran, Jr. ...... A44C 15/0015 315/323 |
| 6,857,739 B1 | * | 2/2005 | Watson .................. G02C 11/04 351/158 |

(Continued)

FOREIGN PATENT DOCUMENTS

| CN | 101579238 A | 11/2009 |
| CN | 102540464 A | 7/2012 |

(Continued)

OTHER PUBLICATIONS

Chinese Office Action dated Jan. 3, 2018.
International Search Report dated Jan. 3, 2017.

*Primary Examiner* — Md Saiful A Siddiqui
(74) *Attorney, Agent, or Firm* — Dilworth & Barrese, LLP; Michael J. Mussela, Esq.

(57) ABSTRACT

A signal acquiring device, including: a sensor, a signal converter and a signal transmitter, wherein the sensor is connected with the signal converter that is connected with the signal transmitter, and the sensor, the signal converter and the signal transmitter are all disposed on the body of a virtual reality apparatus; the sensor is used to detect action signals of the part of the wearer on which the virtual reality apparatus is worn, the signal converter is used to convert the action signals into electrical signals, and the signal transmitter is used to send the electrical signals to the virtual reality apparatus. The device has a high accuracy and improves experience of the wearer. A virtual reality apparatus and a control method thereof are also provided.

18 Claims, 4 Drawing Sheets

(51) Int. Cl.
  *G06F 3/0346* (2013.01)
  *G09G 5/10* (2006.01)
  *G09G 3/32* (2016.01)
  *G09G 3/00* (2006.01)
  *G09G 3/34* (2006.01)

(52) U.S. Cl.
  CPC ........... *G06F 3/0346* (2013.01); *G09G 3/003* (2013.01); *G09G 3/32* (2013.01); *G09G 5/10* (2013.01); *G09G 3/3406* (2013.01); *G09G 2320/0646* (2013.01); *G09G 2320/0666* (2013.01); *G09G 2320/08* (2013.01); *G09G 2354/00* (2013.01)

(58) Field of Classification Search
  CPC ....... G09G 2320/08; G09G 2320/0666; G09G 2320/0646; G09G 2354/00; G09G 3/32; G09G 5/10; G09G 3/003
  See application file for complete search history.

(56) References Cited

U.S. PATENT DOCUMENTS

| | | | |
|---|---|---|---|
| 2008/0191965 A1* | 8/2008 | Pandozy | A61H 5/00 345/8 |
| 2008/0291673 A1* | 11/2008 | Chen | F21S 6/003 362/231 |
| 2011/0304597 A1* | 12/2011 | Hyatt | G09G 3/3426 345/207 |
| 2012/0062444 A1* | 3/2012 | Cok | G02B 27/0172 345/8 |
| 2012/0127284 A1 | 5/2012 | Bar-Zeev et al. | |
| 2012/0235902 A1* | 9/2012 | Eisenhardt | A42B 3/042 345/156 |
| 2013/0257709 A1 | 10/2013 | Raffle et al. | |
| 2014/0293038 A1* | 10/2014 | Delmonico | H04N 5/2256 348/82 |
| 2015/0228121 A1* | 8/2015 | Tsukahara | G06F 3/04817 345/419 |
| 2017/0039769 A1 | 2/2017 | Wu et al. | |

FOREIGN PATENT DOCUMENTS

| | | |
|---|---|---|
| CN | 104750249 A | 4/2015 |
| CN | 104615243 A | 5/2015 |
| CN | 105139349 A | 12/2015 |
| CN | 105511632 A | 4/2016 |
| CN | 205334374 U | 6/2016 |

* cited by examiner

SIGNAL ACQUIRING DEVICE, VIRTUAL REALITY APPARATUS AND CONTROL METHOD THEREOF

CROSS REFERENCE TO RELATED APPLICATIONS

The present application claims priority of China Patent application No. 201610049802,0 filed on Jan. 25, 2016, the content of which is incorporated in its entirety as part of the present application by reference herein.

TECHNICAL FIELD

Embodiments of the present disclosure relate to a signal acquiring device, a virtual reality apparatus and a control method thereof.

BACKGROUND

The Virtual Reality (VR) technology is a high and new technology that has emerged in recent years. The virtual reality technology refers to a technology that uses computer simulation to create a three-dimensional virtual world and provides the user with simulation of sight, hearing, touch and the like to make him feel as if he was on the scene and could view the objects in the three-dimensional space in time without any limitation.

The rapid development of the virtual reality technology has pushed the rapid development of 3D head mounted displays, gesture recognition technologies, motion acquiring technologies, indoor location technologies and other related technologies. And implementations of the related technologies above have also taken a great variety of forms. With the virtual reality technology being increasingly prosperous, now the apparatuses for virtual reality have assumed gradually rich fashions. However, the existing virtual reality apparatuses are mainly used to carry out the functionality of displaying virtual reality contents and a wearer generally uses a handheld controller connected with a virtual reality apparatus to achieve good interaction with virtual scenes. Since virtual reality apparatuses in enclosed immersive virtual reality experiences generally have disadvantages, such as low operational accuracy, difficulty in accurate location control of operating equipments and the like and it is relatively complex to operate the handheld controller connected with a virtual reality apparatus, degrading the wearer's experience.

SUMMARY

According to at least one embodiment of this disclosure, a signal acquiring device is provided, comprising a sensor, a signal converter and a signal transmitter, wherein the sensor is connected with the signal converter, which is connected with the signal transmitter, and the sensor, the signal converter and the signal transmitter are all disposed on the body of a virtual reality apparatus; the sensor is used to detect action signals of the part of the wearer on which the virtual reality apparatus is worn, the signal converter is used to convert the action signals into electrical signals, and the signal transmitter is used to send the electrical signals to the virtual reality apparatus.

For example, the sensor comprises one or more of an angle sensor, a direction sensor, a speed sensor, a three-axis gyroscope, a linear acceleration sensor and a gravitational acceleration sensor.

According to at least one embodiment of this disclosure, a virtual reality apparatus comprising the signal acquiring device is provided.

For example, further comprising a controller that is disposed in the body of the virtual reality apparatus, connected with the signal transmitter, used to receive electrical signals sent by the signal transmitter, and controls the virtual reality device to perform operations corresponding to the electrical signals.

For example, further comprising a brightness regulator that is disposed in the body of the virtual reality apparatus and connected with the controller.

For example, further comprising a brightness regulation mode selection button and a brightness regulation knob, which are disposed on the outer side of the body of the virtual reality apparatus, the brightness regulation mode selection button being connected with both the brightness regulation knob and the brightness regulator.

For example, further comprising a display connected with the controller.

For example, the brightness regulator and/or the brightness regulation knob is connected with a first light source disposed inside the virtual reality apparatus and used to regulate the display brightness of the display.

For example, further comprising a second light source connected with the brightness regulator and/or the brightness regulation knob and used to regulate the internal environment brightness of the body of the virtual reality apparatus.

For example, the second light source surrounds the periphery of the display area of the virtual reality apparatus.

For example, the second light source are LED lights.

For example, the LED lights comprise one or more of white LED lights, yellow LED lights, red LED lights, green LED lights and blue LED lights.

For example, the LED lights comprises white LED lights and yellow LED lights, or red LED lights, green LED lights, blue LED lights and yellow LED lights.

For example, further comprising a collector connected with the controller and the brightness regulator and used to collect the internal environment brightness of the body of the virtual reality apparatus, the display brightness of the display and the current scenes of the virtual reality apparatus.

For example, further comprising an audio player disposed on the inner side of the body of the virtual reality apparatus and connected with the controller.

For example, the virtual reality apparatus comprises a helmet or spectacles.

For example, when the virtual reality apparatus is a helmet, the display is fixed on the body of the helmet and faces to the eyes of the wearer, the sensor is disposed inside the body of the helmet and above the display, and the signal converter and the signal transmitter are also disposed inside the helmet body and at positions corresponding to the top of the wearer's head.

For example, when the virtual reality apparatus is a helmet, the brightness regulation knob and the brightness regulation mode selection button are disposed on the outer side of the helmet and at positions corresponding to the ears of the wearer, the second light source is disposed inside the helmet body and distributed uniformly in a semicircular pattern surrounding the upper part of the display area of the display.

For example, when the virtual reality apparatus are spectacles, the sensor is disposed on the inner side of one arm of the spectacles and the signal converter and the signal transmitter are disposed on the inner side of the other arm of the spectacles.

For example, when the virtual reality apparatus are spectacles, the brightness regulation knob and the brightness regulation mode selection button are disposed on the outer side of one arm of the spectacles and at positions near the lens and the second light source is distributed uniformly surrounding the upper edge and lower edge of the lens.

According to at least one embodiment of this disclosure, a method for controlling a virtual reality apparatus is provided, comprising: receiving electrical signals sent by a signal acquiring device by a controller; and controlling the virtual reality apparatus to perform operations corresponding to the electrical signals according to the electric signals by the controller.

For example, controlling the virtual reality apparatus to perform operations corresponding to the electrical signals according to the electric signals by the controller comprises: receiving first electrical signals sent by the signal acquiring device by the controller; obtaining scenes corresponding to the first electrical signals in accordance with the first electrical signals by the controller; and receiving second electrical signals sent by the signal acquiring device and controlling the virtual reality apparatus to perform operations corresponding to the second electrical signals in the scenes in accordance with the second electrical signals by the controller, wherein the scenes are those to be displayed by the virtual reality apparatus.

For example, performing operations corresponding to the second electrical signals in the scenes comprises: obtaining the scene identification of the scenes by the controller; obtaining the control information corresponding to the scene identification of the scenes from a first preset memory in accordance with the scene identification of the scenes by the controller; and obtaining the operations corresponding to the second electrical signals and performing the operations in the scenes in accordance with the control information by the controller, wherein the control information comprises electrical signals and operations corresponding to the electrical signals.

For example, performing the operations corresponding to the second electrical signals in the scenes by the controller comprises: controlling a display of the virtual reality apparatus to display the operations corresponding to the second electrical signals and/or controlling an audio player to play the sounds corresponding to the second electrical signals in accordance with the second electric signals by the controller.

For example, the method further comprises: regulating the current internal environment brightness and/or color temperature of the virtual reality apparatus or the display brightness of the display of the virtual reality apparatus in accordance with the brightness regulation instruction by the brightness regulation knob, when the brightness regulation mode selection button corresponds to a manual regulation mode, and the brightness regulation knob receives a brightness regulation instruction initiated by the wearer.

For example, regulating the current internal environment brightness and/or color temperature of the virtual reality apparatus in accordance with the brightness regulation instruction by the brightness regulation knob comprises: regulating the regulating brightness of a white LED light in a second light source and/or regulating the regulating color temperature of a yellow LED light in the second light source by the brightness regulation knob; or regulating the regulating brightness of a red, a green and a blue LED lights in the second light source and/or regulating the regulating color temperature of a yellow LED light in the second light source by the brightness regulation knob.

For example, further comprising: when the brightness regulation mode selection button corresponds to an automatic regulation mode, receiving, by the brightness regulator, the internal environment brightness of the body of the virtual reality apparatus, the display brightness of the display of the virtual reality apparatus and the current scenes of the virtual reality apparatus collected by a collector; and obtaining the target internal environment brightness of the body of the virtual reality apparatus or the target display brightness of the display of the virtual reality apparatus corresponding to the current scenes of the virtual reality apparatus from a second preset memory in accordance with the current scenes of the virtual reality apparatus and regulating the current internal environment brightness and/or color temperature of the virtual reality apparatus according to the target internal environment brightness or regulating the display brightness of the display of the virtual reality apparatus according to the target display brightness of the display by the brightness regulator.

For example, regulating the current internal environment brightness and/or color temperature of the virtual reality apparatus according to the target internal environment brightness by the brightness regulator comprises: regulating the regulating brightness of a white LED light in a second light source and/or regulating the regulating color temperature of a yellow LED light in the second light source by the brightness regulator; or regulating the regulating brightness of a red, a green and a blue LED lights in the second light source and/or regulating the regulating color temperature of a yellow LED light in the second light source by the brightness regulator.

DETAILED DESCRIPTION

Specific implementations of the present invention will be further described below with reference to accompanying drawings. The following embodiments are only intended to illustrate the technical solutions of the present disclosure more clearly and in no way to limit the protection scope of the present disclosure.

Figure 1A:
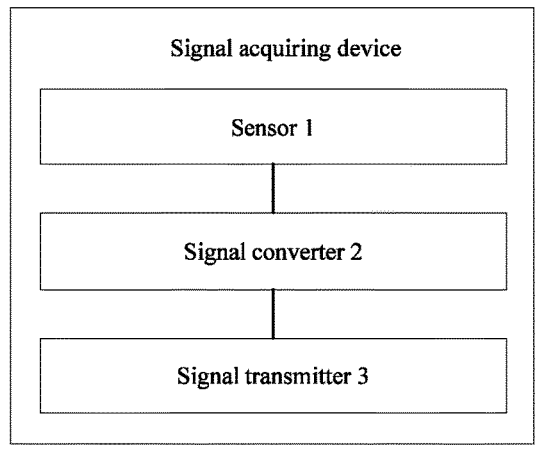
FIG. 1a is a structure diagram of a signal acquiring device provided in an embodiment of the present disclosure.

FIG. 1a shows a structure diagram of a signal acquiring device provided in an embodiment of the present disclosure. As shown in FIG. 1, the signal acquiring device includes a sensor 1, a signal converter 2 and a signal transmitter 3. The sensor 1 is connected with the signal converter 2, which is connected with the signal transmitter 3. The sensor 1, the signal converter 2 and the signal transmitter 3 are all disposed on the body of a virtual reality apparatus.

The sensor 1 is used to detect action signals of the wearer's part on which the virtual reality apparatus is worn.

The sensor collects action signals indicating the direction, angle, speed, acceleration and/or number of the turns that the wearer's part on which the virtual reality apparatus is worn has made. For example, when the virtual reality apparatus is a helmet, the action signals indicate the action of the wearer's head, such as, a left-handed turn, a right-handed turn, head rising and head lowering, as well as the number of head rising actions and the angle of a turn.

Detection of action signals of a part of the wearer may be performed by some sensing components, e.g. any combination of one or more of an angle sensor, a direction sensor, a velocity sensor, a three-axis gyroscope, a linear acceleration sensor, a gravitational acceleration sensor and the like.

The signal converter 2 is used to convert the action signals into electrical signals. For example, the signal converter may be an analog-to-digital converter.

Since the action signals are mechanical energy signals but the signals that can be identified by the controller in the virtual reality apparatus are electrical signals, a signal converter is needed in the present embodiment to convert the action signals, i.e. mechanical energy signals, into electrical signals.

The signal transmitter 3 is used to transmit the electrical signals to the virtual reality apparatus. The signal transmitter includes, for example, RF circuits, antennae, and the like.

It can be understood that the sensor, the signal converter and the signal transmitter are all disposed on the virtual reality apparatus in the present embodiment. The sensor may be in wired or wireless connection with the signal converter. The sensor detects control information from the apparatus-worn part, the signal converter converts the action signals into electrical signals, and the signal transmitter transmits the electrical signals to the virtual reality apparatus, which will control its display in accordance with the electrical signals. The operation is simple and convenient and the wearer's experience is improved, for only the action of the part on which the virtual reality apparatus is worn is needed instead of sending operation signals to the virtual reality apparatus by means of a handheld controller. It is because that display of a virtual reality apparatus needs to be carried out in an enclosed environment, but the virtual reality apparatus in such an environment have problems of low operational accuracy, difficulty in accurate control of operating equipments and the like.

Figure 1B:
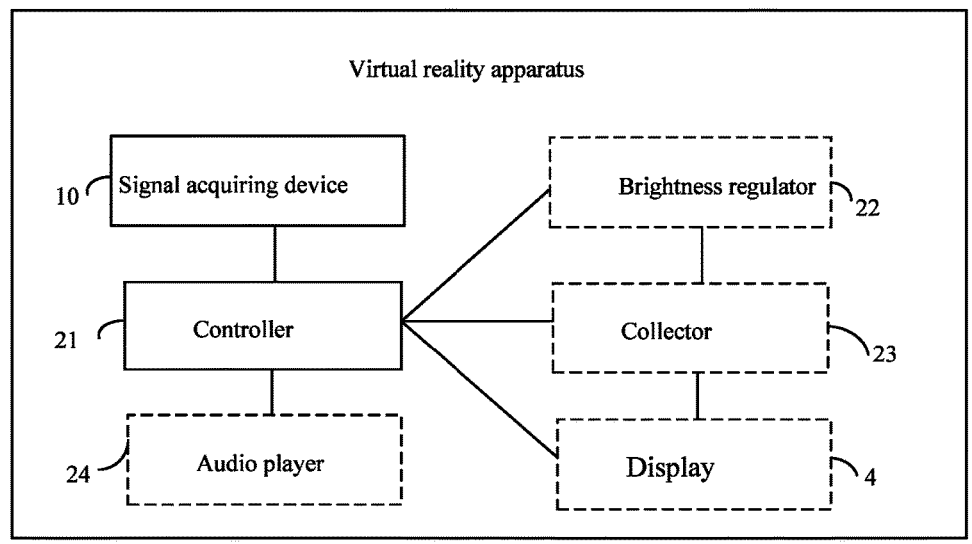
FIG. 1b is a structure diagram of a virtual reality apparatus provided an embodiment of the present disclosure.

An embodiment of the present disclosure further provides a virtual reality apparatus. FIG. 1b is a structure diagram of the virtual reality apparatus provided in the present embodiment. As shown in FIG. 1b, the virtual reality apparatus includes a signal acquiring device 10 described above. The virtual reality apparatus having the signal acquiring device 10 can control its display and/or sounds only by means of the action of the part on which the virtual reality apparatus is worn, solving the problem of being inconvenient to transmit action signals to the virtual reality apparatus by means of a handheld controller in existing technologies. In addition, the virtual reality apparatus including the signal acquiring device is convenient and simple to operate, improving the wearer's experience.

According to an example of the present disclosure, the virtual reality apparatus further includes a controller 21 disposed into the body of the virtual reality apparatus. The controller 21 is connected with the signal transmitter, used to receive electrical signals sent by the signal transmitter and controls the virtual reality apparatus to carry out operations corresponding to the electrical signals, so that display and/or sounds of the virtual reality apparatus are controlled in accordance with the electrical signals, for example, the game screen, reading screen, audio switch, brightness regulation and the like of the virtual reality apparatus may be controlled in accordance with the electrical signals. As a result, the hands of the wearer are freed to make operation convenient and simple and improve the wearer's experience is improved. For example, the controller 21 may be implemented as a microprocessor chip.

The virtual reality apparatus may further include a brightness regulator 22, which is connected with the controller 21 and may be disposed, for example, in the body of the virtual reality apparatus.

Furthermore, the virtual reality apparatus may include a brightness regulation mode selection button 7 and a brightness regulation knob 6. The brightness regulation mode selection button may be connected with both the brightness regulation knob and the brightness regulator. The brightness regulation mode selection button and the brightness regulation knob are disposed on the outer side of the virtual reality apparatus and used to regulate the brightness of scenes of the virtual reality apparatus and the display brightness of a display 4, so that the wearer can make regulations as per his preference and have improved user experience.

For example, the brightness regulation enables both the display brightness of the display and the environment scene brightness of the virtual reality apparatus to be regulated, so that the change in display brightness of the display may be perceived by human eyes according to the environment scene brightness.

In the first way, the display brightness of the display is regulated. Here, the virtual reality apparatus includes a first light source disposed therein. The first light source is connected with the brightness regulator and/or brightness regulation knob and used to regulate the display brightness of the display. The luminance of the first light source is regulated by the brightness regulator or the brightness regulation knob.

In the second way, the internal environment scene brightness of the body of the virtual reality apparatus is regulated. Here, the virtual reality apparatus includes a second light source, which is connected with the brightness regulator and/or the brightness regulation knob.

Of course, the first way and the second way may be deployed at the same time and selected to be used as desired by the wearer. If the second way is taken, the second light source will be used. However, the regulation in the second way is relatively simple than the regulation in the first way. During manufacture, one of the two ways may be set according to the wearer's requirements or both of them may be set. The present embodiment is not limited in this aspect.

In the second way, the second light source surrounds the periphery of the display area of the virtual reality apparatus. The second light source may be LED lights including one or more of white LED lights, yellow LED lights, red LED lights, green LED lights and blue LED lights.

For example, the LDE lights include white LED lights for regulation of brightness and yellow LED lights for regulation of color temperature; or red LED lights, green LED lights and blue LED lights that produce white light for brightness regulation in combination and yellow LED lights for regulation of color temperature. In the present embodiment, it is preferable to use red, green and blue LED lights in combination to produce white light for brightness regulation, because, when LED lights of three primary colors are used in combination to produce white light, there will be more room for regulation in color shift, illuminance, optical rotation etc.

The virtual reality apparatus may further include a collector 23 used to collect the internal environment brightness of the body of the virtual reality apparatus, the display brightness of the display of the virtual reality apparatus and the current scene of the virtual reality apparatus. The collector is connected with the controller and the brightness regulator and may use an endoscope, a camera or the like. It can be appreciated that there may be one or more such collectors. When there is only one such collector, it should be capable of collecting the internal environment brightness of the body of the virtual reality apparatus, the display brightness of the display and the current scene of the virtual reality apparatus simultaneously. Of course, there may be disposed three collectors that are used to collect the internal environment brightness of the body of the virtual reality apparatus, the display brightness of the display and the current scene of the virtual reality apparatus respectively. The present embodiment is explained in the case that there is only one collector, but the number of such collectors is not limited.

The virtual reality apparatus may further include an audio player 24 disposed on the inner side of the body of the virtual reality apparatus and a display disposed in the virtual reality apparatus and facing to the eyes of the wearer. The audio player and the display both are connected with the controller, which sends control signals to and thus controls the display to display the operations corresponding to the electrical signals and sends control signals to and thus controls the audio player to play music or sounds corresponding to the scenes, e.g. the sounds of game scenes in which the wearer is playing games or the like.

In the present embodiment, the virtual reality apparatus may be, for example, a helmet or spectacles.

Positions of individual components in the virtual reality apparatus as a helmet or spectacles will be described in details hereafter with reference to accompanying figures.

Figure 2:
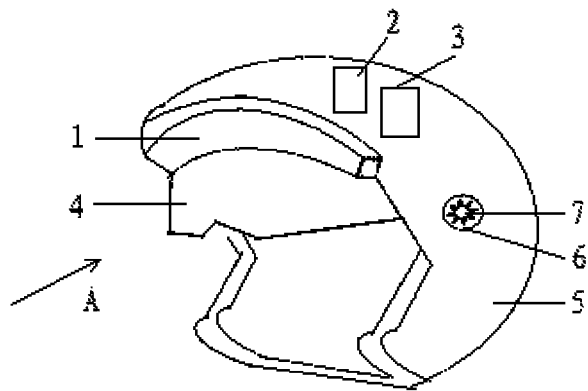
FIG. 2 is a side view of a helmet provided in an embodiment of the present disclosure.
Figure 3:
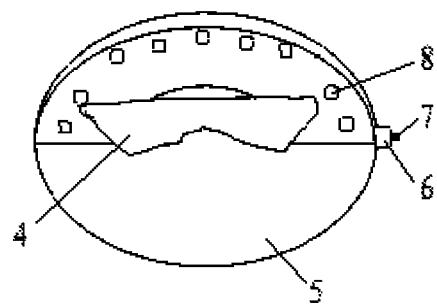
FIG. 3 is a perspective view in the A direction of a helmet provided in an embodiment of the present disclosure.

When the virtual reality apparatus is a helmet, as shown in FIG. 2, the display 4 is fixed on the helmet body 5 and faces the eyes of the wearer, the sensor 1 is disposed inside the helmet body 5 and above the display 4, the signal converter 2 and the signal transmitter 3 are disposed inside the helmet body and at positions corresponding to the top of the wearer's head, and the brightness regulation knob 6 and the brightness regulation mode selection button 7 are disposed on the outer side of the helmet body 5 and correspond to the wearer's ears. As shown in FIG. 3, the second light source 8 is disposed inside the helmet body 5 and distributed uniformly in a semicircle pattern surrounding the upper part of the display area of the display 4. In view of the appearance of the helmet and the wearing comfort given by the inside of the helmet body, the controller and the brightness regulator are disposed into the helmet body.

Figure 4:
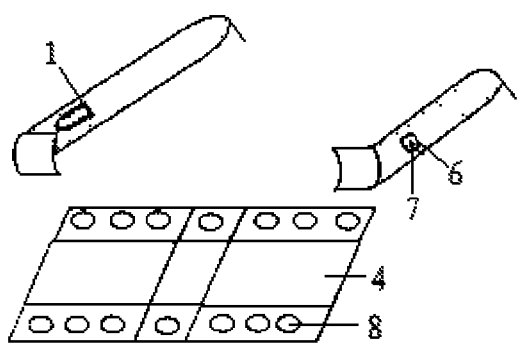
FIG. 4 is a structure diagram of spectacles provided in an embodiment of the present disclosure.

When the virtual reality apparatus are spectacles, as shown in FIG. 4, the sensor 1 is disposed on the inner side of an arm of the spectacles. The signal converter 2 and the signal transmitter 3 (not shown in FIG. 4) are disposed on the inner side of the other arm of the spectacles. The brightness regulation knob 6 and the brightness regulation mode selection button 7 are disposed on the outer side of an arm of the spectacles and near the lens. The second light source 8 surrounds the upper and the lower edges of the lens uniformly, or of course it may be disposed on both lateral sides. The present embodiment is not limited in this aspect. In order to improve comfort for the wearer, the sensor 1, signal converter 2 and the signal transmitter 3 are generally disposed on inner sides of the arms and near the lens. In this way, the sensor 1, the signal converter 2 and the signal transmitter 3 are not in contact with the wearer's skin, preventing the wearer from uncomfortable feeling caused by friction with his skin. Similar to the case of a helmet, the controller and the brightness regulator are disposed into the arms of the spectacles.

Of course, the present embodiment is not limited to the specific positions of the individual components in the helmet or spectacles, and the accompanying figures above and the description thereof are only used to illustrate an optional implementation.

The present embodiment further provides a method for controlling display of the virtual reality apparatus described above, the method including:

step A, in which the controller receives electrical signals sent by the signal acquiring device; and step B, in which the controller controls, in accordance with the electric signals, the virtual reality apparatus to perform operations corresponding to the electrical signals.

Figure 5:
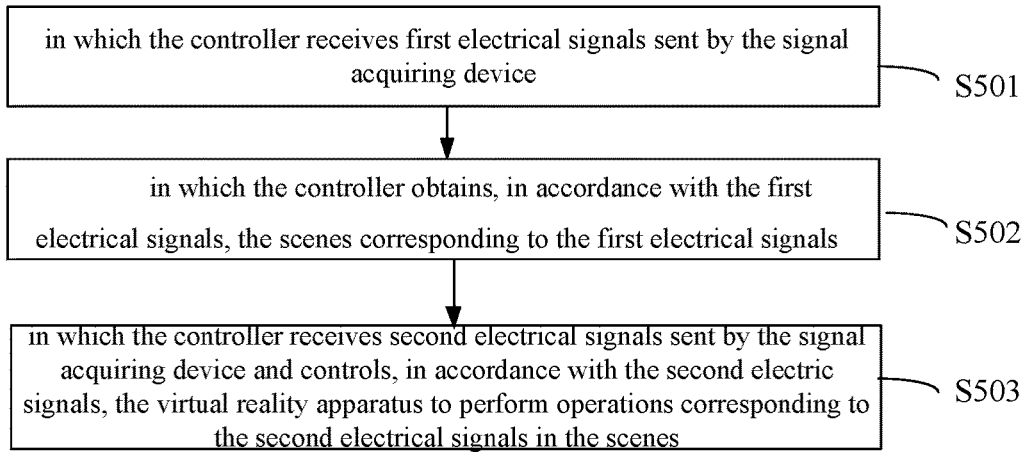
FIG. 5 is a flow chart of a method for controlling a virtual reality apparatus provided in an embodiment of the present disclosure.

FIG. 5 shows a flow chart illustrating a method for controlling display of the virtual reality apparatus described above. As shown in FIG. 5, the method includes:

step 501, in which the controller receives first electrical signals sent by the signal acquiring device;

step 502, in which the controller obtains, in accordance with the first electrical signals, the scenes corresponding to the first electrical signals; and step 503, in which the controller receives second electrical signals sent by the signal acquiring device and controls, in accordance with the second electric signals, the virtual reality apparatus to perform operations corresponding to the second electrical signals in the scenes.

At this point, the scenes are those to be displayed by the virtual reality apparatus.

Figure 6:
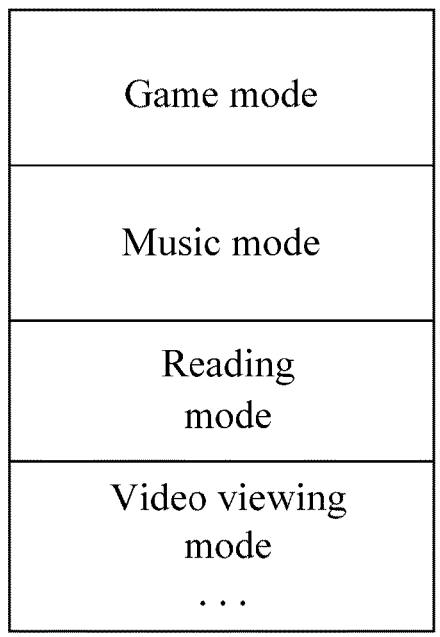
FIG. 6 is a schematic diagram of a screen for scene selection provided in an embodiment of the present disclosure.

In the method above, the controller obtains scenes in accordance with the first electrical signals. As shown in FIG. 6, the wearer may select scenes by nodding, raising his head, turning his head to the left, turning his head to the right and the like and can set which of the actions to correspond to selection of reality scenes based on his own custom.

The controller obtaining information corresponding to the action signals in accordance with the second electrical signals in step 503 further includes the following sub-steps not shown in FIG. 5.

In sub-step 5031, the controller obtains the scene identification of the scenes.

For example, since the virtual reality apparatus may have a variety of scenes, such as, game scenes, scenes in a music mode, scenes in a reading mode, scenes in a video viewing mode and the like and each type of scenes has a corresponding scene identification. The present embodiment is not limited any specific scene identification, e.g. the first letters of a type of scenes, such as, YQ, YY, YD or the like.

In sub-step 5032, the controller obtains control information corresponding to the scene identification of the scenes from a first preset memory in accordance with the scene identification.

The first preset memory has correspondence relationship between scene identifications, electrical signals and actions stored therein.

In sub-step 5033, the controller obtains operations corresponding to the second electrical signals in accordance with the control information and displays the operations in the scenes.

The control information includes electrical signals and operations corresponding to the electrical signals.

It can be appreciated that the controller carrying out the operations corresponding to the second electrical signals in the scenes may include the controller controlling the display of the virtual reality apparatus to display the operations corresponding to the second electrical signals in the scenes and/or controlling the audio player to play sounds corresponding to the second electrical signals in accordance with the second electrical signals.

By way of example, control is performed by turning direction of the head, for example, when a racing game is played in the game mode, turning the head to the left, i.e. in the −x direction, controls the racing car to turn left, turning the head to the right, i.e. in the +x direction, controls the racing car to turn right, raising the head, i.e. in the +z direction, controls the car to accelerate, lowering the head, i.e. in the −z direction controls the car to decelerate, inclining the head forward, i.e. in the +y direction turns on an air blast mode, inclining the head backward, i.e. in the −y direction controls a visual angle switch, and any combination can be taken for control, such as, turning left followed by turning right, turning left followed by inclining backward, turning left followed by two times of turning right, and the like. The correspondence relationship of operations with the directions of the x, y, z coordinate axes and the action signals indicating the directions, number of times of and combinations of head turns may be defined by the wearer to his preference.

Control can be performed by the angle of a head turn, for example, during music playing in the music mode, a head turn of 30 degrees controls the volume to increase, a head turn of 45 degrees controls the volume to decrease, a head turn of 60 degrees plays the next track, a head turn of 90 degrees switches the play pattern, and any combination can be taken for control, such as, a turn of 30 degrees followed by a turn of 30 degrees, a turn of 30 degrees followed by a turn of 45 degrees, a turn of 30 degrees followed by two 45-degree turns, and the like. The correspondence relationship of operations with action signals indicating angles and combinations of turns may be defined by the wearer to his preference.

Control may be performed by the speed of a head turn, for example, during e-book reading in the reading mode, a slow turn controls page turning, a turn of a medium speed controls proceeding to the next chapter, a rapid turn controls returning to the list, and any combination can be taken for control, such as, a rapid turn followed by a slow turn, a rapid turn followed by two medium-speed turns and the like. The correspondence relationship of operations with the action signals indicating speeds and combinations of head turns may be defined by the wearer to his preference.

The directions, angles, speeds and numbers of head turns may be used in any combination. For example, during a racing game, the bigger the amplitude of the inclination to right of the head is, the bigger the amplitude of the turn of the racing car is, or the faster the head turns to the right, the faster the racing car turns.

In addition, the directions, angles, speeds and numbers of head turns may be used individually or in any combination to control the display brightness of the display or the current internal environment brightness of the virtual reality apparatus.

For example, during e-book reading in the reading mode, turning the head to the left means page turning, and tuning the head to the left twice consecutively means decreasing the display brightness of the display or the current internal environment brightness of the virtual reality apparatus. In the case of the latter, the controller will obtain the control information corresponding to the scene identification of the scenes from the first preset memory in accordance with the electrical signals of turning the head to the left twice consecutively and obtain the information corresponding to the electrical signals in accordance with the control information. At this time, since the information corresponds to the operation of brightness regulation, the controller will send the operation to the brightness regulator, so that the brightness regulator may regulate the display brightness of the display or the current internal environment brightness of the virtual reality apparatus according to the operation.

Figure 7:
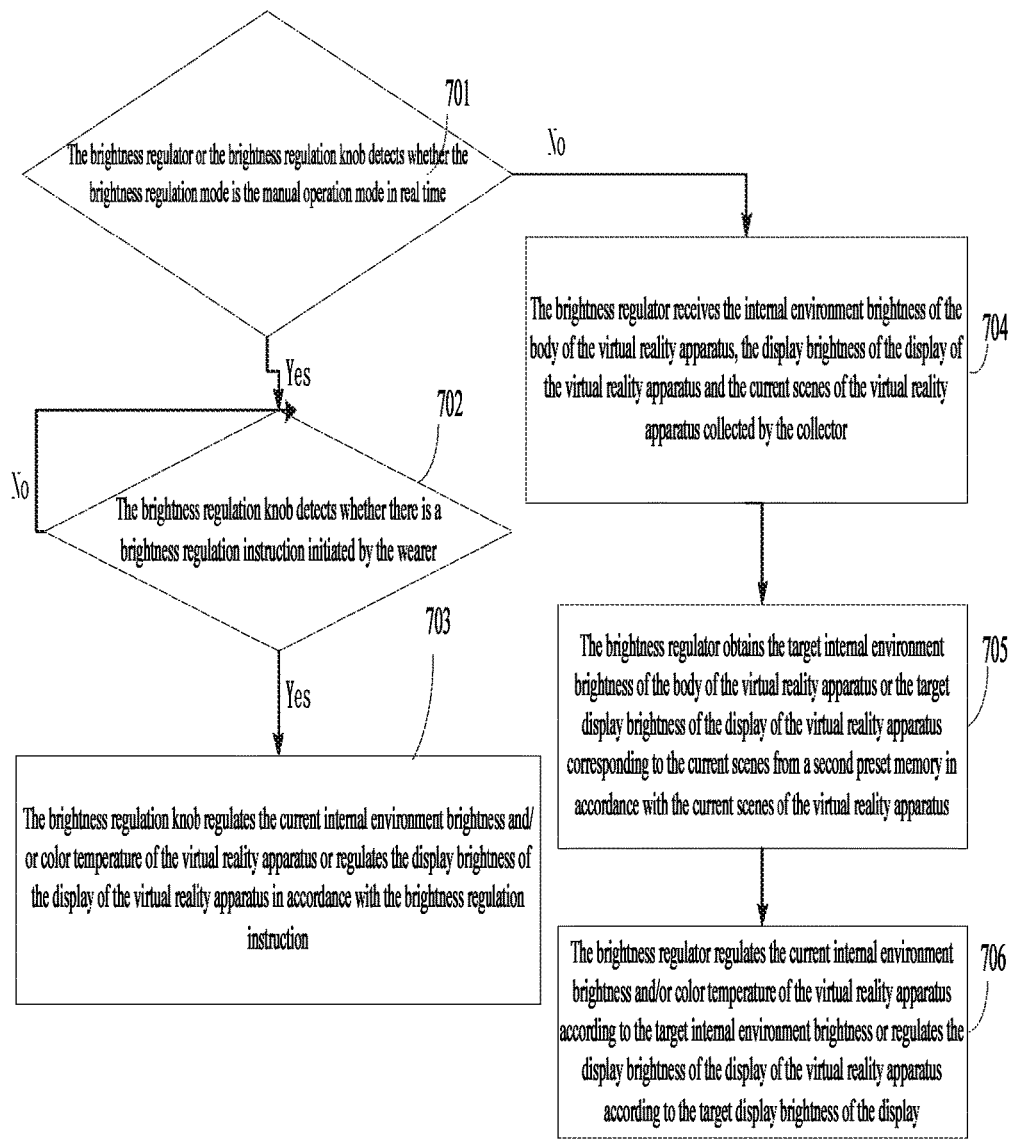
FIG. 7 is a flow chart of a method of regulating scene brightness of a virtual reality apparatus provided in an embodiment of the present disclosure.

In the present embodiment, in addition to regulating brightness by means of electrical signals from the wearer, brightness may also be regulated manually or automatically in the following steps, as shown in FIG. 7.

In step 701, the brightness regulator or the brightness regulation knob detects whether the brightness regulation mode is the manual operation mode in real time; if yes, step 702 is performed, or if no, step 704-706 are performed.

In step 702, the brightness regulation knob detects whether there is a brightness regulation instruction initiated by the wearer; if yes, step 703 is performed, or if no, step 702 is continued.

In step 703, the brightness regulation knob regulates the current internal environment brightness and/or color temperature of the virtual reality apparatus or regulates the display brightness of the display of the virtual reality apparatus in accordance with the brightness regulation instruction.

By way of example, the brightness regulation knob regulating the current internal environment brightness and/or color temperature of the virtual reality apparatus in accordance with the brightness regulation instruction includes regulating brightness by the brightness regulation knob regulating the white LED lights in the second light source and/or regulating color temperature by the brightness regulation knob regulating the color temperature of the yellow LED lights in the second light source.

Alternatively, the brightness regulation knob regulates the red, green and blue LED lights in the second light source and/or the color temperature of the yellow LED lights in the second light source.

In step 704, the brightness regulator receives the internal environment brightness of the body of the virtual reality apparatus, the display brightness of the display of the virtual reality apparatus and the current scenes of the virtual reality apparatus collected by the collector.

In step 705, the brightness regulator obtains the target internal environment brightness of the body of the virtual reality apparatus or the target display brightness of the display of the virtual reality apparatus corresponding to the current scenes from a second preset memory in accordance with the current scenes of the virtual reality apparatus.

In step 706, the brightness regulator regulates the current internal environment brightness and/or color temperature of the virtual reality apparatus according to the target internal environment brightness or regulates the display brightness of the display of the virtual reality apparatus according to the target display brightness of the display.

By way of example, the brightness regulator regulating the current internal environment brightness and/or color temperature according to the target internal environment brightness includes:

regulating the brightness by the brightness regulator regulating the white LED lights in the second light source and/or regulating the color temperature by the brightness regulator regulating the yellow LED lights in the second light source; or regulating the brightness by the brightness regulator regulating the red, green and blue LED lights in the second light source and/or regulating the color temperature by the brightness regulator regulating the yellow LED lights in the second light source.

The method may be summarized as:

a manual brightness regulation mode, wherein when the brightness regulation mode selection button corresponds to the manual regulation mode and the brightness regulation knob receives a brightness regulation instruction initiated by the wearer, the brightness regulation knob regulates the current internal environment brightness and/or color temperature of the virtual reality apparatus or the display brightness of the display of the virtual reality apparatus in accordance with the brightness regulation instruction; and an automatic regulation mode, wherein when the brightness regulation mode selection button corresponds to the automatic regulation mode, the brightness regulator receives the internal environment brightness of the body of, the display brightness of the display of and the current scenes of the virtual reality apparatus collected by the collector, and the brightness regulator obtains the target internal environment brightness of the body of the virtual reality apparatus or the target display brightness of the display of the virtual reality apparatus corresponding to the current scenes from the second preset memory in accordance with the current scenes of the virtual reality apparatus and regulates the current internal environment brightness of the virtual reality apparatus and/or color temperature according to the target internal environment brightness or regulates the display brightness of the display of the virtual reality apparatus according to the target display brightness of the display.

For example, in the automatic brightness regulation mode, when the scenes on the display change in color, for example, when the scenes in the video viewing mode change from night scenes to daytime scenes, the brightness will experience the consequent change from dark to bright and prevent the abrupt change of color from dazzling the eyes of the wearer.

Utilizing the contact between the virtual reality apparatus and the wearer's head, the method described above controls the operations in and the display brightness (including the display brightness of the display and the internal environment brightness of the virtual reality apparatus) of the scenes of the virtual reality apparatus by the turning the head, so that both hands of the wearer are freed to make the operation convenient and simple and the experience from the enhanced/virtual reality system improved. At the same time, the supplemental lighting from the second light source, i.e. LED lights also enables the environment brightness offered by the enhanced/virtual reality system to be regulated, satisfying different requirements for brightness of different users.

It can be appreciated by those skilled in the art that the implementations described above are only used to illustrate and in no way to limit the present disclosure. In some examples, well-known methods, structures and technologies are not described in details so as not to obscure comprehension of the specification.

All the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

It should be noted finally that, all the embodiments above is only to illustrate the technical solution of the disclosure, and not limit the scope of the disclosure; although this disclosure is illustrated in detail referring to the foregoing each embodiment, those skilled in the art should know that, they can still make modifications to the technical solution in the foregoing embodiments, or make equivalent variations to part or all of the technical features; and these modifications and variations will not make the substance of the corresponding technical solution to depart from the scope of the technical solution of the embodiments of this disclosure, they should all fall into the scope of the claims and specification of this disclosure.

The invention claimed is:

1. A virtual reality apparatus, comprising: a signal acquiring device, a display an a controller, wherein
the signal acquiring device comprises a sensor, a signal converter and a signal transmitter, wherein
the sensor is connected with the signal converter, which is connected with the signal transmitter, and the sensor, the signal converter and the signal transmitter are all disposed on body of the virtual reality apparatus;
the sensor is used to detect action signals of part of a wearer on which the virtual reality apparatus is worn,
the signal converter is used to convert the action the signals into electrical signals, and
the signal transmitter is used to send the electrical signals to the virtual reality apparatus;
the display is connected with the controller;
the electrical signals comprises a first electrical signal and the controller is configured to receive the first electrical signal sent by the signal acquiring device, and is further configured to obtain a scene corresponding to the first electrical signal in accordance with the first electrical signal, and to allow the display to display the scene corresponding to the first electrical signal;
the virtual reality apparatus further comprises a brightness regulator that is disposed in the body of the virtual reality apparatus and connected with the controller; and
the virtual reality apparatus further comprises a collector connected with the controller and the brightness regulator, and used to collect internal environment brightness of the body of the virtual reality apparatus, the display brightness of the display and a current scene of the virtual reality apparatus, wherein the brightness regulator is configured to receive the internal environment brightness of the body of the virtual reality apparatus, the display brightness of the display of the virtual reality apparatus and the current scene of the virtual reality apparatus collected by a collector;

the brightness regulator is further configured to obtain target internal environment brightness, which is corresponding to the current scene of the virtual reality apparatus, of the body of the virtual reality apparatus or target display brightness, which is corresponding to the current scene of the virtual reality apparatus, of the display of the virtual reality apparatus from a second preset memory based on the current scene of the virtual reality apparatus; and the brightness regulator is further configured to regulate at least one of current internal environment brightness and color temperature of the virtual reality apparatus based on the target internal environment brightness or to regulate the display brightness of the display of the virtual reality apparatus based on the target display brightness of the display.

2. The virtual reality apparatus of claim 1, wherein the sensor comprises one or more of an angle sensor, a direction sensor, a speed sensor, a three-axis gyroscope, a linear acceleration sensor and a gravitational acceleration sensor.

3. The virtual reality apparatus of claim 1, wherein
the controller is disposed in the body of the virtual reality apparatus;

the electrical signals further comprises a second electrical signal, and the controller is further configured to receive the second electrical signal sent by the signal acquiring device;

the controller is further configured to obtain a scene identification of the scene, and to obtain control information corresponding to the scene identification of the scene from a first preset memory according to the scene identification of the scene, wherein the control information comprises correspondence information between the electrical signals and operations; and the controller is further configured to obtain an operation, corresponding to the second electrical signal, according to the control information, and to perform the operation in the scene.

4. The virtual reality apparatus of claim 3, further comprising an audio player disposed on an inner side of the body of the virtual reality apparatus and connected with the controller.

5. The virtual reality apparatus of claim 3, wherein the controller is further configured to control the display of the virtual reality apparatus to display the operation, corresponding to the second electrical signal, in the scene.

6. The virtual reality apparatus of claim 3, wherein the controller is further configured to control an audio player to play sounds corresponding to the second electrical signal in accordance with the second electrical signal.

7. The virtual reality apparatus of claim 1, further comprising a brightness regulation mode selection button and a brightness regulation knob, which are disposed on an outer side of the body of the virtual reality apparatus, the brightness regulation mode selection button being connected with both the brightness regulation knob and the brightness regulator.

8. The virtual reality apparatus of claim 1, wherein at least one of the brightness regulator and the brightness regulation knob is connected with a first light source disposed inside the virtual reality apparatus and used to regulate the display brightness of the display.

9. The virtual reality apparatus of claim 1, further comprising a second light source connected with at least one of the brightness regulator and the brightness regulation knob and used to regulate internal environment brightness of the body of the virtual reality apparatus.

10. The virtual reality apparatus of claim 9, wherein the second light source surrounds periphery of a display area of the virtual reality apparatus.

11. The virtual reality apparatus of claim 9, wherein the second light source are LED lights.

12. The virtual reality apparatus of claim 11, wherein the LED lights comprise one or more of white LED lights, yellow LED lights, red LED lights, green LED lights and blue LED lights.

13. The virtual reality apparatus of claim 11, wherein the LED lights comprises white LED lights and yellow LED lights, or red LED lights, green LED lights, blue LED lights and yellow LED lights.

14. The virtual reality apparatus of claim 1, wherein the virtual reality apparatus comprises a helmet or spectacles.

15. The virtual reality apparatus of claim 14, wherein when the virtual reality apparatus is a helmet, the display is fixed on body of the helmet and faces to eyes of the wearer, the sensor is disposed inside the body of the helmet and above the display, and the signal converter and the signal transmitter are also disposed inside the helmet body and at positions corresponding to top of the wearer's head.

16. The virtual reality apparatus of claim 15, wherein when the virtual reality apparatus is a helmet, a brightness regulation knob and a brightness regulation mode selection button are disposed on an outer side of the helmet and at positions corresponding to ears of the wearer, the second light source is disposed inside the helmet body and distributed uniformly in a semicircular pattern surrounding an upper part of a display area of the display.

17. The virtual reality apparatus of claim 14, wherein when the virtual reality apparatus are spectacles, the sensor is disposed on the inner side of one arm of the spectacles and the signal converter and the signal transmitter are disposed on the inner side of the other arm of the spectacles.

18. The virtual reality apparatus of claim 17, wherein when the virtual reality apparatus are spectacles, a brightness regulation knob and a brightness regulation mode selection button are disposed on an outer side of one arm of the spectacles and at positions near a lens and the second light source is distributed uniformly surrounding an upper edge and a lower edge of the lens.

* * * * *